(12) United States Patent
Zeyfang et al.

(10) Patent No.: US 9,027,603 B2
(45) Date of Patent: May 12, 2015

(54) OPEN ENDED INDUSTRIAL PIPE CAP WITH RECESSED FINGER GRIP

(75) Inventors: Frederick W. Zeyfang, Erie, PA (US); William H. Sardini, Erie, PA (US); Brian Lyle Mayo, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 73 days.

(21) Appl. No.: 13/414,342

(22) Filed: Mar. 7, 2012

(65) Prior Publication Data

US 2012/0227854 A1 Sep. 13, 2012

Related U.S. Application Data

(60) Provisional application No. 61/457,354, filed on Mar. 7, 2011.

(51) Int. Cl.
*F16L 57/00* (2006.01)
*F16L 55/11* (2006.01)

(52) U.S. Cl.
CPC ............ *F16L 55/1141* (2013.01); *F16L 57/005* (2013.01)

(58) Field of Classification Search
USPC ....... 138/96 R, 96 T; 220/265, 266, 268, 269, 220/270
See application file for complete search history.

(56) References Cited

U.S. PATENT DOCUMENTS

| | | | |
|---|---|---|---|
| 906,875 A | 12/1908 | Hammer | |
| 1,214,675 A | 2/1917 | Heath | |
| 1,584,313 A | 5/1926 | Mallory | |
| 1,600,860 A | 9/1926 | Young | |
| 1,758,613 A | 5/1930 | Lafal | |
| 2,108,583 A | 2/1938 | Falk | |
| 2,130,609 A | 9/1938 | Alexander | |
| 2,133,049 A | 10/1938 | Shimer | |
| 2,143,480 A | 1/1939 | Gunderman | |
| 2,157,842 A | 5/1939 | Armitage et al. | |
| 2,316,013 A | 4/1943 | Mulholland | |
| 2,544,969 A * | 3/1951 | Underwood | 413/17 |
| 2,898,943 A | 8/1959 | Kennedy | |
| 3,276,613 A | 10/1966 | Bozek | |
| 3,511,402 A | 5/1970 | Cheeley | |
| 3,733,002 A | 5/1973 | Fujio | |

(Continued)

FOREIGN PATENT DOCUMENTS

| | | |
|---|---|---|
| DE | 28 34 489 | 2/1980 |
| DE | 102 22 308 | 11/2003 |
| FR | 1125546 | 7/1956 |

*Primary Examiner* — James Hook
(74) *Attorney, Agent, or Firm* — Brian B. Shaw, Esq.; Harter Secrest & Emery LLP

(57) ABSTRACT

An open ended cap for a pipe is provided comprising a flexible tubular body wherein one end has a downwardly-extending radial rim. The tubular body includes a finger grip member recessed from the end of the cap and extending inwardly from an inner periphery of the rim and connected to a tear strip extending across the rim and downwardly along at least a portion of the tubular body. The tubular body optionally has an interior wall surface having multiple compressible longitudinal fit beads which are configured to provide contact with the external surface of a pipe upon being inserted into the end cap. The open ended cap may be used in conjunction with a closed end cap fit within the bore of the pipe to maximize protection of both the exterior and interior of the pipe.

20 Claims, 3 Drawing Sheets

(56) References Cited

U.S. PATENT DOCUMENTS

| | | | |
|---|---|---|---|
| 3,799,381 A | 3/1974 | Action | |
| 3,911,960 A | 10/1975 | Flimon | |
| 3,996,966 A * | 12/1976 | Princell | 138/89 |
| 4,239,062 A * | 12/1980 | Callicoatte | 138/96 R |
| 4,487,229 A | 12/1984 | Dreyfuss et al. | |
| 4,538,740 A | 9/1985 | Peterson | |
| 4,616,679 A | 10/1986 | Benton | |
| 5,080,245 A | 1/1992 | Conard | |
| 5,129,531 A | 7/1992 | Beck et al. | |
| 5,292,018 A | 3/1994 | Travisano | |
| 5,996,833 A | 12/1999 | Lencioni et al. | |
| 6,176,267 B1 * | 1/2001 | Dugan et al. | 138/89 |
| 6,237,790 B1 | 5/2001 | Verderber | |
| 6,499,616 B2 | 12/2002 | Verderber | |
| 6,655,553 B2 | 12/2003 | Staniszewski et al. | |
| 6,854,616 B2 * | 2/2005 | Steffan | 220/270 |
| 7,284,770 B2 * | 10/2007 | Dell'erba et al. | 285/45 |
| 7,703,626 B2 * | 4/2010 | Witt | 220/276 |
| D615,164 S | 5/2010 | Zeyfang | |
| D617,426 S | 6/2010 | Zeyfang | |
| 8,051,879 B2 | 11/2011 | Zeyfang | |
| 2010/0200098 A1 * | 8/2010 | Zeyfang | 138/89 |
| 2010/0326560 A1 | 12/2010 | Zeyfang | |
| 2012/0227854 A1 | 9/2012 | Zeyfang | |

* cited by examiner

OPEN ENDED INDUSTRIAL PIPE CAP WITH RECESSED FINGER GRIP

This application claims priority pursuant to 35 USC 119(e) of U.S. provisional application No. 61/457,354, filed Mar. 7, 2011, the entire contents of which are herein incorporated by reference in its entirety.

BACKGROUND OF THE INVENTION

The present invention is directed to an open ended cap for industrial pipes, and primarily for oil country tubular goods (OCTG) such as threaded tubing and casing.

Open ended pipe caps have been used for many years to protect the threaded ends of tubing and casing goods. The caps typically have a uniform wall thickness and are difficult to install, frequently fall off during transportation and handling, and are difficult to remove. To prevent the caps from prematurely falling off, the caps are frequently intentionally undersized in relation to the pipe to be protected to provide a higher degree of interference between the pipe and the cap. However, this solution has not always been successful, as the caps at times still fall off or have so much interference that they become very difficult to remove, and the end user often is forced to use a knife or tool to aid in the removal of the end cap from the pipe. This often damages the threads that the end cap was originally put on the pipe to protect.

It is thus an object of the present invention to provide an end cap for use with threaded tubing and casing that is easy to install with a single motion, as well as easy for the end user to remove.

It is also an object of the present invention to provide an end cap which provides some impact resistance when installed over the end of the pipe.

SUMMARY OF THE PRESENT INVENTION

In accordance with the present invention, there is thus provided a flexible open ended cap for a pipe, the open ended cap comprising a tubular body having first and second open ends. The first end has an downwardly-extending radial rim forming an annular groove serving as an abutment surface for a pipe when inserted into the end cap.

The tubular body includes a finger grip member extending inwardly from an inner periphery of the rim and recessed from the end of the cap, with the finger grip member being connected to a tear strip extending across the rim and downwardly along the longitudinal extent of the tubular body.

The tubular body preferably has an interior wall surface having multiple compressible longitudinal fit beads extending inwardly from the interior wall surface and spaced about the circumference of the interior wall surface, the beads being configured to provide contact along the longitudinal surface of the beads with pipe threads along the external surface of a pipe upon the pipe being inserted into the end cap.

The open ended cap of the present invention may also be used together with a closed end cap to provide substantially complete sealing of an end of a pipe, with the open ended cap being inserted over and in retaining relationship to the closed end cap on the end of the pipe.

DETAILED DESCRIPTION OF THE INVENTION

The invention will be described in connection with FIGS. 1-8.

The pipe end cap 1 of the present invention comprises a tubular body 3 having a first open end 5 and a second open end 7.

Figure 1:
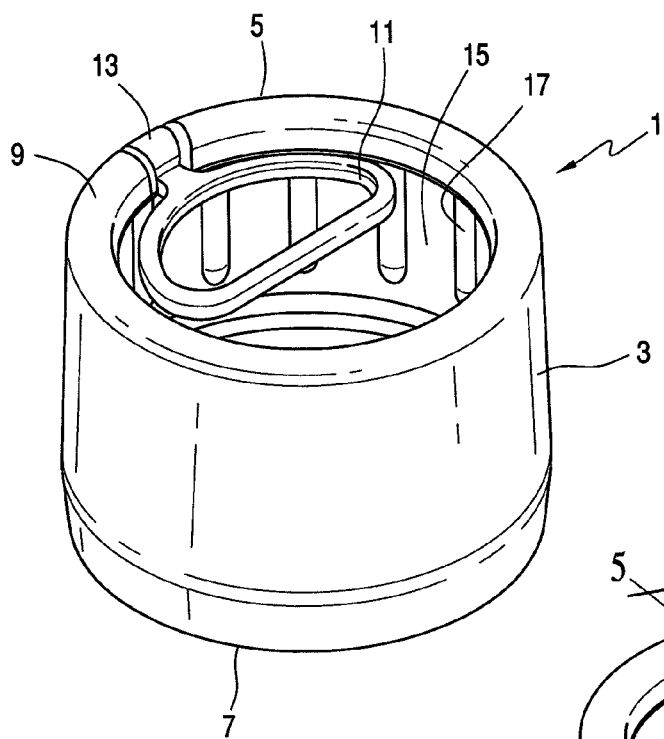
FIG. 1 is a perspective view of an embodiment of the open ended cap of the present invention as viewed from the top.
Figure 2:
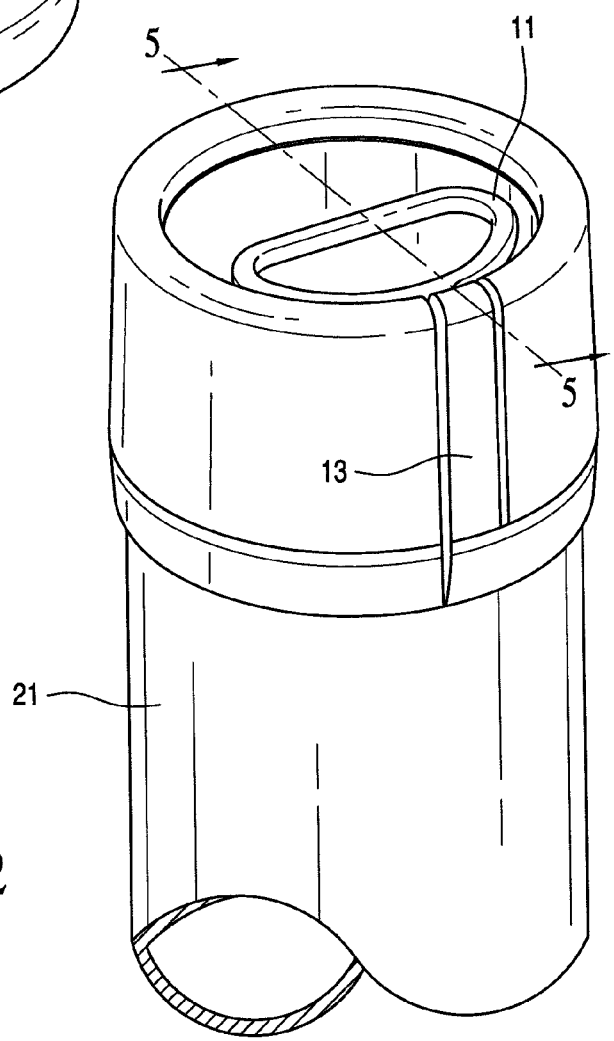
FIG. 2 is a perspective view of an embodiment of the end cap of the present invention when inserted on the end of a pipe.
Figure 3:
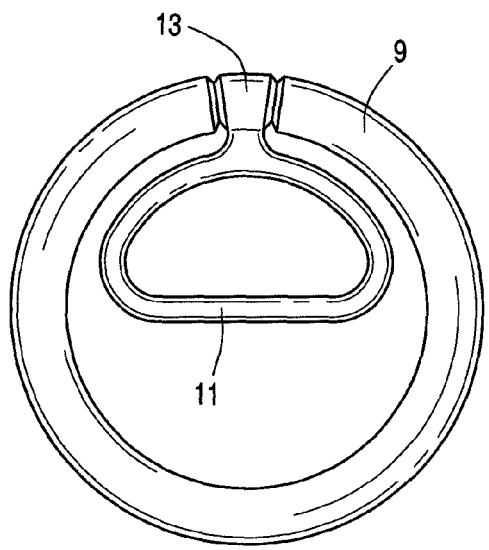
FIG. 3 is a top view of the end cap of the present invention.
Figure 4:
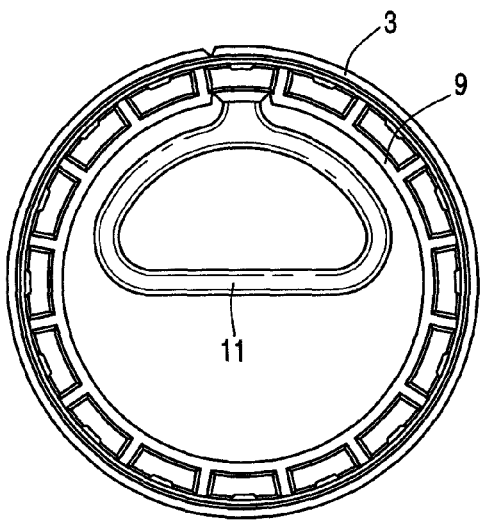
FIG. 4 is a bottom view of the end cap of the present invention.
Figure 5:
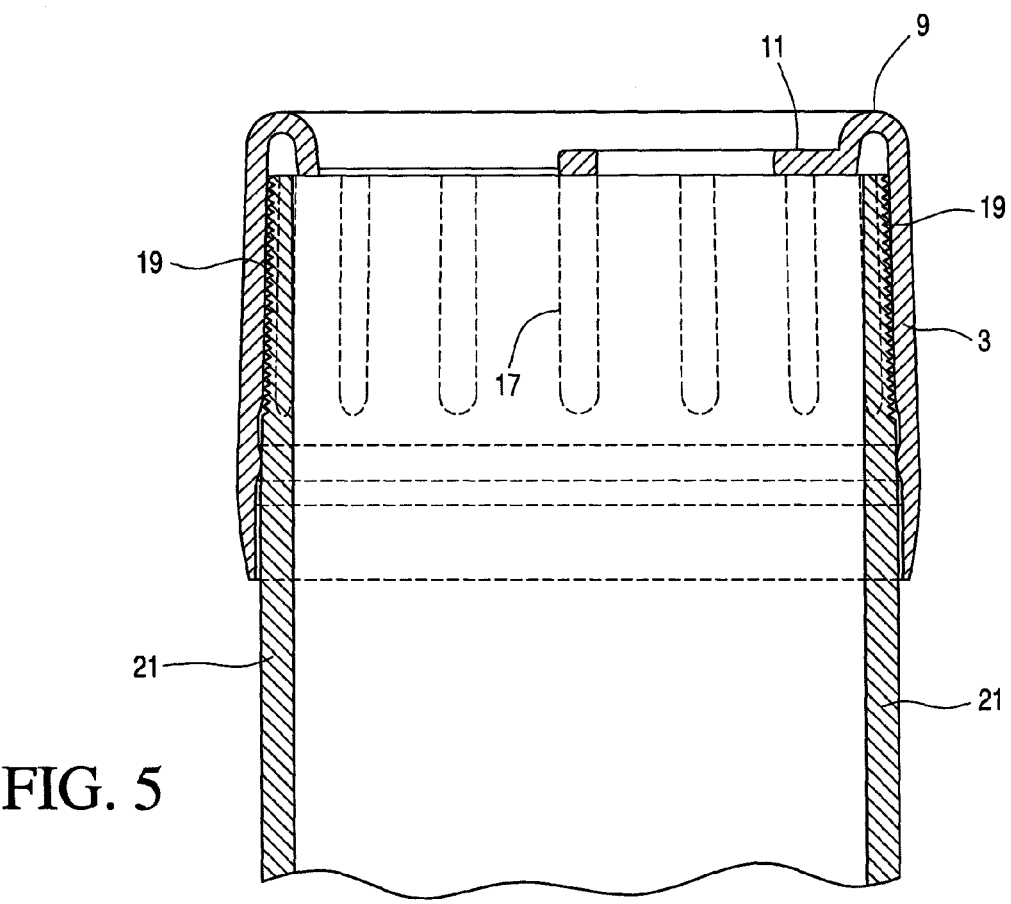
FIG. 5 is a cross-sectional view of the end cap of the present invention when inserted onto the end of a pipe as shown in FIG. 2.

As shown in FIGS. 1 and 2, a first end 5 of the open ended wall cap includes a downwardly-extending radial rim 9 which serves as an abutment surface for a pipe 21 when inserted into the end cap as shown in FIG. 5. As shown in FIG. 4, radial ribs may be provided within the annular groove formed by the rim 9, which serve to provide both structural stability to the rim, as well as assisting in providing an abutment surface for an end of an inserted pipe 21. The rim 9 extends around the periphery of the end 5.

A finger grip member in the form of a pull ring 11 extends from a position below the rim, with the pull ring being connected to a tear strip 13 which extends across the rim and downwardly along at least a portion of the longitudinal extent of the tubular body.

While shown in FIGS. 1, 2 and 4 as a pull ring, the finger grip member may take many forms, which forms are not critical to practice of the claimed invention. For instance, the finger grip member may be in the form of a pull ring, or the finger grip member may comprise a tab member.

In operation, once installed on the end of a pipe (FIGS. 2, 5, 8), the finger grip member is gripped and the member pulled upwardly and outwardly away from the hole and downwardly along the side of the tubular body to pull the tear strip away from the tubular body. Upon the tearing of the tear strip along its furthest extent along the tubular body, whereby adjacent portions of the tubular body are caused to be separated from one another, the tubular body may be easily separated from engagement with the end of the pipe.

In one embodiment, the opposing edges of the tear strip each extend to the bottom of the tubular body, such that, when the tear strip is intentionally torn, it completely separates from the body. Alternatively, it is possible for one side of the tear strip to extend down only partially along the longitudinal extent of the tubular body while the other side extends to the bottom of the tubular body (FIG. 2), so that, once torn, one end of the tear strip remains in contact with the tubular body, as opposed to being fully torn therefrom. However, despite that fact that the tear strip may remain in contact with the tubular body, the tubular body is caused to be sufficiently loosened from its grip with the end of the pipe and easily removed.

The tear strip 13 may take many forms. For instance, the tear strip may extend downwardly along the tubular body generally in a line substantially perpendicular to the planes of the first and second holes. The tear strip may also extend radially about the side of the tubular member.

The tear strip may be formed by conventional means such as by molding parallel linear areas of reduced thickness in relation to adjacent areas of the tubular member, such that the linear areas of reduced thickness are more easily ripped or torn when force is applied thereto by means of gripping and exerting force to the attached finger grip member.

The inner wall of the tubular body may be smooth in accordance with one embodiment of the present invention. However, in order to enhance the fit between the interior wall and the wall of a pipe inserted into the end cap, the interior wall surface 15 of the tubular member optionally may include multiple longitudinal fit beads 17 extending from the interior surface of wall 15 and spaced about the circumference of the interior surface. The beads 17 are configured at their innermost point to provide contact with a pipe wall along the longitudinal surface of the beads upon insertion of the pipe into the end cap. The external surface of a pipe 21, upon being inserted into the end cap 1, abuts the innermost portion of the surface of the beads 17, and become snugly fit within the end cap body due to the combined action of the beads as they become compressed against the external surface of the pipe 21, and in particular, the pipe threads 19 located at the end of the pipe. The bead geometry, material selection, and proportional size allow for the beads to slide over the thread crest during assembly, and then cold flow or creep into the adjacent thread to lock the cap onto the threaded end of the pipe.

The beads 17 extend longitudinally along an extent of the inner surface of the wall 15, preferably beginning substantially adjacent one open end and terminating substantially adjacent the other open end. It is thus within the scope of the invention for the beads to terminate short of each end, such that the ends of the beads are spaced from each open end. If spaced from either end, such spacing distance is not particularly critical to practice of the invention. However, to enhance contact with the threads on the pipe, it is preferred that the beads 17 extend substantially to the second open end 7.

The end of the beads 17 closest to the second open end 7 preferably has a tapered configuration to permit ease of insertion of the end of the pipe 21 into the end cap 1 and over the edge of the beads. The particular form of tapering is not critical to practice of the invention. The slope of the taper is also not critical, and will generally range from about 0.25 to 3 degrees. The beads extend along the interior surface of the wall 15 in a line parallel to the longitudinal axis of the end cap.

The number of longitudinal beads employed may vary. At a minimum, three fit beads would be employed, preferably equally spaced about the circumference of the wall 15 for purpose of stability upon insertion of the pipe. It is frequently desirable, however, to use a larger number of fit beads in order to minimize the spacing between the beads, while also ensuring a secure fit against the pipe surface due to the greater number of contact points between the fit beads and the pipe wall. A larger number of fit beads may assist in minimizing the entry of extraneous material such as dirt, moisture, etc. into the pipe through the spaces between the fit beads. The fit bead geometry and geometric proportions allow both (a) the sliding of the cap over the threaded tubing during installation and not allowing the sharp steel tubing thread crests to shear the fit bead making the cap loose after installation, and (b) the fit bead to creep into the tubing thread profile after initial assembly, and lock appropriately onto the threaded tubing. The locking bead creep flow must overcome long term plastic stress relaxation, daily thermal weather cycles when capped tubing is stored in outside conditions, and thermal expansion and contraction of the plastic cap which occurs under a variety of weather extremes encountered at different locales.

Obviously, the number of fit beads employed will depend upon the size of the end cap, the size of the fit beads, and the amount of surface of the end cap desired to have fit beads. One of ordinary skill in the art can readily arrive at acceptable dimensions upon practice of the present invention.

The diameter of the fit beads depends upon the size of the end cap, with smaller end caps having fit beads of smaller dimension than larger end caps The above embodiments are provided solely by way of example, and are not intended to be limiting as to the ultimate scope of the present invention. For example, different diameters of end caps may be employed, as well as different numbers of fit beads used in the end caps.

The fit beads may be of any configuration which provides the requisite contact with the pipe wall. While rounded bead heads 19 are shown in the Figures, beads which have a more flattened upper surface, may be used with advantage.

The fit beads do not all need to be equally spaced about the circumference of the wall 15, nor do the fit beads have to be placed about the entire circumference. It is only necessary for sufficient fit beads to be at sufficient points about the circumference for the end cap to be snugly attached to the pipe.

For instance, the fit beads may be employed in groupings about the circumference of the wall 15. That is, multiple groupings of, for instance, 8 equally spaced fit beads may be present along the circumference, with a larger space being provided between the respective groupings of fit beads than between the individual fit beads within the groupings. Other configurations may occur to those skilled in the art, such as groupings with smaller or larger numbers of fit beads, or different numbers of groupings about the circumference, which are within the scope of the invention. It is merely necessary for there to be sufficient contact between the fit beads and the pipe wall for the end cap to be securely attached to the pipe.

Fit beads can be essentially touching adjacent fit beads, with a minimum spacing of about 0.010 inch desirable. Preferably, the space between the fit beads ranges from about 0.20 to about 0.30 inch, with the exception of when the fit beads are grouped about the circumference, in which case the groups of fit beads themselves may be spaced further apart.

The size (diameter and height) of the fit beads is not critical, and is generally determined by the diameter of the end cap. It is important for the fit bead to have sufficient height so as to enable the fit bead to have adequate mass to be compressed in a manner which serves to maintain the end cap in place on the pipe wall.

The geometry of the wall and the fit beads enables several advantages to be achieved. Since the combined thickness of the fit beads and the adjacent wall is significantly greater than thickness of the wall portion which forms the space between the fit beads, this enables the wall portion between the fit beads to be smaller in thickness than might normally be the case. Indeed, the thickness of the wall portion may be reduced by up to 50 percent or so. This enhances the flexibility of such wall portion and enables the end cap wall to flex more easily under extreme temperature conditions.

The spacing of the fit beads is desirably proportional to a 1:2 to 1:6 ratio of fit bead to wall section perimeter to allow the beads to slide over mating pipe threads during installation and then cold flow or creep into the pipe threads to lock the cap onto the pipe. The geometry of the circular cross-section of the fit beads additional assists in allowing the bead to slide over the pipe threads during installation, and not shear or become damaged during cap installation, yet creep into the pipe thread profile to secure retention after the cap is securely positioned on the pipe thread.

The tubular member may also have such dimensions as to provide ease of insertion over the end of the pipe, while still ensuring that the end cap is satisfactorily retained on the end of the pipe. For instance, the outside diameter of the end of the tubular member which is inserted over the end of the pipe may be slightly larger than the outside diameter of the end of the tubular member which includes the radial rim. In this way, the end cap is more easily inserted over the end of the pipe, with the end of the pipe being more snuggly fit into the opposite end of the tubular member.

Figure 6:
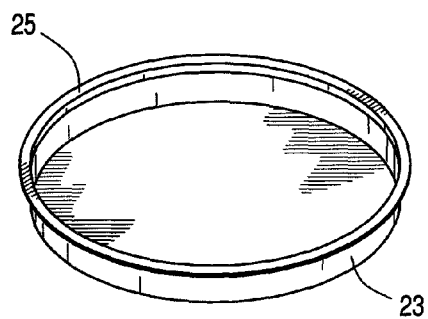
FIG. 6 is a perspective view of a closed end pipe end cap used in conjunction with the open ended pipe cap of the present invention.
Figure 7:
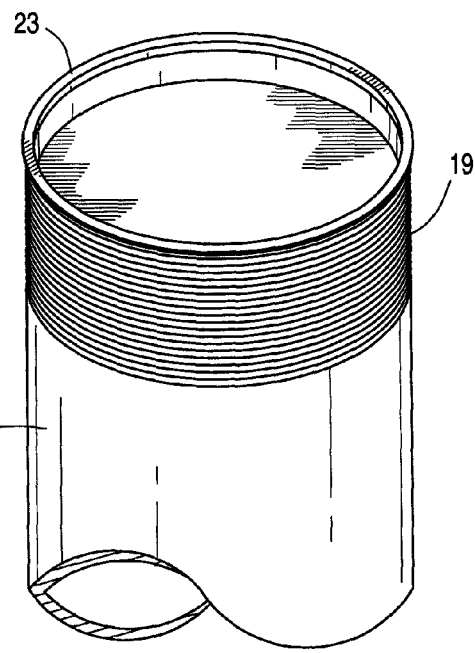
FIG. 7 is a perspective view of the end cap of FIG. 6 inserted onto the end of a pipe.
Figure 8:
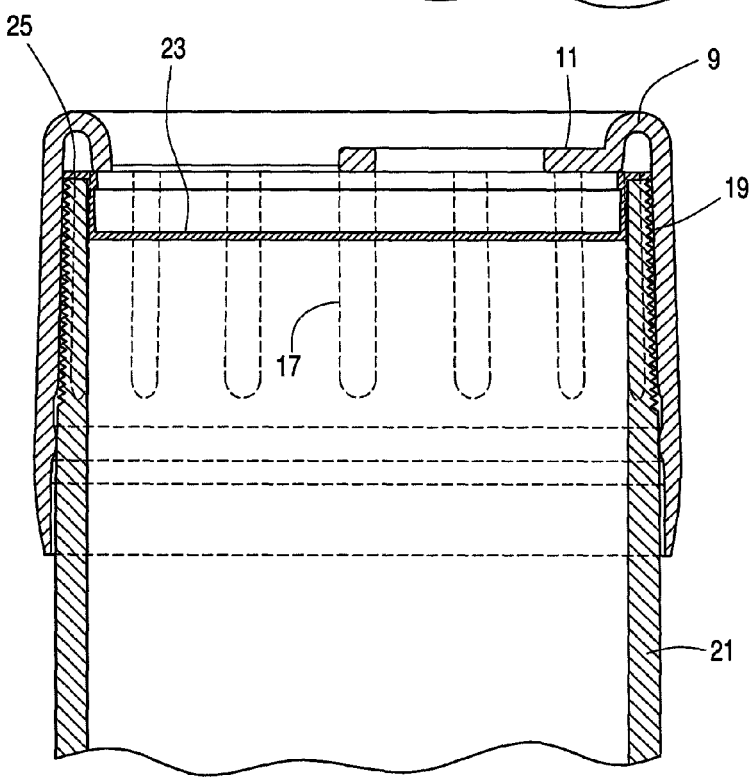
FIG. 8 is a cross-sectional view of the end cap assembly of the present invention where the open ended end cap of the present invention is inserted over the closed end pipe end cap.

FIGS. 6-8 depict an embodiment of the present invention where the open ended pipe cap of the present invention is used together with a closed end cap. The closed end cap 23 has a closed end portion of such dimension as to fit within the bore of the pipe, and has a circumferential flange 25 which seats against the end of the pipe to retain the cap in place. The degree of fit within the bore of the pipe is not critical, and the cap may be either loosely or snugly fit within the bore. However, for ease of installation and removal, it is preferred that the cap loosely fit within the bore of the pipe for ease of removal.

Once the closed end cap is installed on the end of the pipe (FIG. 7), the bore of the pipe is sealed against the environment, and otherwise protected against entry by animals or reptiles, etc. seeking shelter. The open end pipe cap of the present invention may then be placed onto the end of the pipe, thus not only protecting the end of the pipe, but retaining the closed end cap in place on the end of the pipe (FIG. 8). The resulting assembly is easily removed upon tearing of the tear strip on the open ended pipe cap and removal of same, and subsequent removal of the closed end cap from the end of the pipe. The two-piece assembly thus not only protects the end of the pipe and the pipe threads, but seals the bore of the pipe from the elements and intruders seeking shelter.

It is contemplated that the open end pipe cap of the present invention will be used in connection with pipes having various diameters, although the particular size of the pipe is not critical, as the end cap can be molded to fit any desired size of pipe, with the pipe inner diameter being large enough to accommodate the recessed finger grip and provides sufficient dimension for gripping the recessed finger grip.

The end cap of the present invention may be produced by conventional injection molding techniques. The material employed for the end cap will typically be polyethylene, for the reason that it is cost-effective, is flexible, and provides good weather resistance. Either low density or linear low density polyethylene or flexible vinyl are preferred molding materials for use in the present invention. The use of such polyethylene or vinyl material enables the fit beads, when employed, to both allow the fit bead to slide across the pipe thread crests during installation, yet still relax and creep into the thread after being positioned on the end of the pipe. One of ordinary skill in the art can readily determine acceptable molding materials from which the open ended pipe cap may be made.

What is claimed is:

1. An open ended cap for an industrial pipe, the open ended cap comprising:
   a flexible tubular body having first and second open ends, the first end having a downwardly-extending radial rim, and
   a finger grip member recessed from the first open end of the tubular body and extending inwardly from an inner periphery of the downwardly-extending radial rim, with the finger grip member being connected to a tear strip extending across the rim and downwardly along at least a portion of a longitudinal extent of the tubular body.

2. The cap of claim 1, wherein one lateral edge of the tear strip extends downwardly along a portion of the longitudinal extent of the tubular body, whereby an opposing lateral edge extends along a full extent of the tubular body.

3. The cap of claim 1, wherein the tear strip extends downwardly along the longitudinal extent of the tubular body.

4. The cap of claim 1, wherein the tear strip extends spirally about the tubular body.

5. The cap of claim 1, wherein the finger grip member comprises a pull ring, the pull ring being connected to the tear strip.

6. The cap of claim 1, wherein the tubular body has an interior wall surface having multiple compressible longitudinal fit beads extending from the interior wall surface and spaced about the circumference of the interior wall surface, the beads configured to provide contact along the longitudinal surface of the beads with an external surface of a pipe upon being inserted into the cap, an end of the longitudinal fit beads closest to the second open end being tapered.

7. The cap of claim 6, wherein the longitudinal fit beads are evenly spaced about the entire circumference of the interior wall surface.

8. The cap of claim 6, wherein the longitudinal fit beads have a curved surface.

9. The cap of claim 6, wherein the longitudinal fit beads terminate at a point spaced from the first end.

10. The cap of claim 1, wherein the tear strip extends downwardly along an outer surface of the tubular body.

11. A sealed pipe assembly comprising a pipe having a sealed end, the sealed end being sealed by having inserted thereon a closed end cap having a portion seated within a bore of the pipe, and an open ended cap inserted on the remaining end of the pipe, the open ended cap comprising a flexible tubular body having first and second open ends, the first open end having a downwardly-extending radial rim, and a finger grip member recessed from the first open end of the cap and extending inwardly from an inner periphery of the downwardly-extending radial rim, with the finger grip member being connected to a tear strip extending across the rim and downwardly along at least a portion of the tubular body.

12. The assembly of claim 11, wherein one lateral edge of the tear strip extends downwardly along a portion of the tubular body, whereby an opposing lateral edge extends along the full extent of the tubular body.

13. The assembly of claim 11, wherein the tear strip extends downwardly along a longitudinal extent of the tubular body.

14. The assembly of claim 11, wherein the tear strip extends spirally about the tubular body.

15. The assembly of claim 11, wherein the finger grip member comprises a pull ring, the pull ring being connected to the tear strip.

16. The assembly of claim 11, wherein the tubular body has an interior wall surface having multiple compressible longitudinal fit beads extending from the interior wall surface and spaced about the circumference of the interior wall surface, the beads configured to provide contact along the longitudinal surface of the beads with an external surface of a pipe upon being inserted into the end cap, an end of the longitudinal fit beads closest to the second open end being tapered.

17. The assembly of claim 16, wherein the longitudinal fit beads are evenly spaced about the entire circumference of said wall the interior wall surface.

18. The assembly of claim 16, wherein the longitudinal fit beads have a curved surface.

19. The assembly of claim 16, wherein the longitudinal fit beads terminate at a point spaced from the first end.

20. The assembly of claim 11, wherein the tear strip extends downwardly along an outer surface of the tubular body.

* * * * *